(12) United States Patent
Shimodaira

(10) Patent No.: US 9,248,526 B2
(45) Date of Patent: Feb. 2, 2016

(54) METHOD FOR MANUFACTURING WELDING MATERIAL AND WELDING MATERIAL

(75) Inventor: Kenichi Shimodaira, Ina (JP)

(73) Assignee: KSA CO., LTD., Nagano (JP)

( * ) Notice: Subject to any disclaimer, the term of this patent is extended or adjusted under 35 U.S.C. 154(b) by 49 days.

(21) Appl. No.: 13/809,228

(22) PCT Filed: Sep. 27, 2011

(86) PCT No.: PCT/JP2011/072129
§ 371 (c)(1),
(2), (4) Date: Jan. 9, 2013

(87) PCT Pub. No.: WO2012/043595
PCT Pub. Date: Apr. 5, 2012

(65) Prior Publication Data
US 2013/0104696 A1     May 2, 2013

(30) Foreign Application Priority Data

Sep. 28, 2010   (JP) .................................. 2010-217736
Oct. 5, 2010   (JP) .................................. 2010-225816

(51) Int. Cl.
*B23K 35/40* (2006.01)
*B23K 35/24* (2006.01)
(Continued)

(52) U.S. Cl.
CPC ............... *B23K 35/40* (2013.01); *B22F 3/1007* (2013.01); *B22F 3/1017* (2013.01);
(Continued)

(58) Field of Classification Search
CPC ..... B23K 35/40; B23K 35/24; B23K 35/3053

USPC .................................. 75/302; 419/23, 24, 28
See application file for complete search history.

(56) References Cited

U.S. PATENT DOCUMENTS 4,769,212 A * 9/1988 Nakamura et al. ............... 419/28
5,055,128 A * 10/1991 Kiyota et al. .................... 75/246
(Continued)

FOREIGN PATENT DOCUMENTS

EP   0824986 A1 * 2/1998
JP   51-100946 A   9/1976
(Continued)

OTHER PUBLICATIONS

International Search Report corresponding to PCT/JP2011/072129, dated Dec. 27, 2011.

*Primary Examiner* — Roy King
*Assistant Examiner* — Jenny Wu
(74) *Attorney, Agent, or Firm* — Hauptman Ham, LLP

(57) ABSTRACT

A method for manufacturing a welding material includes: a compound preparing step in which a compound is prepared by mixing alloy powder containing first alloy powder having a first average particle size and second alloy powder having a second average particle size, a water soluble binder and water; a drying step; an extruding step; a degreasing step in which the extruded formed body is heated to a predetermined temperature of 400° C. or above; a C—O reaction step in which the extruded formed body is heated to a predetermined temperature which falls within a range of 950° C. to 1150° C. under a vacuum atmosphere; and a sintering step in which the extruded formed body is heated to a predetermined temperature which falls within a range of 1200° C. to 1350° C. under a nitrogen gas atmosphere thus forming a welding material.

13 Claims, 8 Drawing Sheets

(51) Int. Cl.
*B23K 35/02* (2006.01)
*B22F 3/10* (2006.01)

(52) U.S. Cl.
CPC ............ *B23K 35/0261* (2013.01); *B23K 35/24* (2013.01); *B23K 35/406* (2013.01); *B22F 2998/10* (2013.01); *B22F 2999/00* (2013.01)

(56) References Cited

U.S. PATENT DOCUMENTS

| | | | | |
|---|---|---|---|---|
| 5,059,388 | A | * | 10/1991 | Kihara et al. ................... 419/37 |
| 5,067,979 | A | * | 11/1991 | Kiyota et al. ................... 75/243 |
| 5,338,508 | A | * | 8/1994 | Nitta et al. ................... 420/120 |
| 5,937,265 | A | * | 8/1999 | Pratt et al. ................... 419/6 |
| 6,436,550 | B2 | * | 8/2002 | Sakata et al. ................... 428/553 |
| 2003/0177866 | A1 | * | 9/2003 | Veloff et al. ................... 75/339 |
| 2004/0011495 | A1 | * | 1/2004 | Fischers et al. ................... 164/46 |
| 2007/0235895 | A1 | * | 10/2007 | Yamamura et al. ........... 264/148 |
| 2011/0123384 | A1 | * | 5/2011 | Park ................................ 419/18 |

FOREIGN PATENT DOCUMENTS

| | | | | |
|---|---|---|---|---|
| JP | 63216903 | A | * | 9/1988 |
| JP | 1-138095 | A | | 5/1989 |
| JP | 3-232904 | A | | 10/1991 |
| JP | 5-005105 | A | | 1/1993 |
| JP | 1180804 | A | | 3/1999 |
| JP | 2000-153392 | A | | 6/2000 |
| JP | 2001-294906 | A | | 10/2001 |
| JP | 2004-018886 | A | | 1/2004 |
| JP | 200635314 | A | | 2/2006 |
| KR | 19920007456 | B1 | | 9/1992 |
| KR | 1020060040019 | A | | 5/2006 |
| WO | WO 2010010993 | A1 | * | 1/2010 |

* cited by examiner

| | evaluation method 1 | evaluation method 2 | | evaluation method 3 | evaluation method 4 | evaluation method 5 | evaluation method 6 | evaluation method 7 | evaluation method 8 | comprehensive evaluation |
|---|---|---|---|---|---|---|---|---|---|---|
| | presence or non-presence of breaking by cracking | straightness | circularity (b/a) | sintering density ratio | pin hole | carbon content | chromium content | oxygen content | nitrogen content | |
| example 1 | good | good | 98% | 97% | very good | 1.25% | 30.84% | 0.011% | 0.220% | good |
| example 2 | good | good | 98% | 97% | good | 1.25% | 30.83% | 0.012% | 0.030% | good |
| comparison example 1 | bad | bad | 74% | 92% | bad | 1.41% | 29.48% | 0.23% | ... | bad |
| comparison example 2 | bad | bad | 89% | 94% | bad | 1.38% | 29.16% | 0.21% | ... | bad |

FIG.4 example 1 example 1 example 1

500μm

400μm

400μm

400μm

METHOD FOR MANUFACTURING WELDING MATERIAL AND WELDING MATERIAL

RELATED APPLICATIONS

The present application is a National Phase of International Application Number PCT/JP2011/072129, filed Sep. 27, 2011, and claims priority from Japanese Application Number 2010-217736, filed Sep. 28, 2010 and Japanese Application Number 2010-225816, filed Oct. 5, 2010.

TECHNICAL FIELD

The present invention relates to a method for manufacturing a welding material, and a welding material.

BACKGROUND ART

With respect to a welding material, as a rod-shaped welding material (hereinafter referred to as a welding rod), conventionally, there has been known a welding rod which is made of a hard-to-work material such as a Co-based alloy, a Ni-based alloy or an Fe-based alloy. Among these hard-to-work materials, as the Co-based alloy, for example, Stellite (Stellite: registered trade mark owned by Deloro Stellite Holdings Corporation) is known. As the Ni-based alloy, for example, COLMONOY (COLMONOY: registered trade mark owned by Wall Colmonoy corporation), INCONEL (INCONEL: registered trade mark owned by Huntington Alloys Canada Ltd.) and the like are known. As the Fe-based alloy, for example, stainless steel such as JIS D410 is known. Conventionally, as a method for manufacturing a welding rod made of such a hard-to-work material, a method for manufacturing a welding rod by an extrusion method is known (for example, see patent literatures 1 and 2).

Out of these manufacturing methods, the method for manufacturing a welding rod described in patent literature 1 is performed by carrying out the following steps in order. That is, the method for manufacturing a welding rod includes: a compound preparing step in which a compound is prepared by mixing alloy powder made of a hard-to-work material (spheroidal alloy powder of Stellite No. 6) and a binder made of a polybutene binder (thermo plastic resin); an extruding step in which an extruded formed body is prepared by extruding the compound from a forming nozzle at a temperature of 130° C.; a degreasing step in which a binder component is removed from the extruded formed body by heating the extruded formed body prepared in the extruding step (degreasing temperature: 450° C. to 550° C.); and a sintering step in which the extruded formed body from which the binder component is removed in the degreasing step is heated under a vacuum atmosphere ($5 \times 10^{-4}$ Torr) thus forming a welding rod (sintering temperature: 1280° C.) (see embodiment of patent literature 1).

On the other hand, the method for manufacturing a welding rod described in patent literature 2 is performed by carrying out the following steps in order. That is, the method for manufacturing a welding rod includes: a compound preparing step in which a compound is prepared by mixing alloy powder made of a hard-to-work material (atomized powder of Stellite No. 6 alloy), a binder made of a methylcellulose-based binder and water; an extruding step in which an extruded formed body is prepared by extruding the compound from a forming nozzle; a degreasing step in which a binder component is removed from the extruded formed body by heating the extruded formed body prepared in the extruding step (degreasing temperature: 200° C.); and a sintering step in which the extruded formed body from which the binder is removed in the degreasing step is heated thus forming a welding rod (sintering temperature: 1250° C.) (see embodiment of patent literature 2).

According to the method for manufacturing a welding rod described in patent literature 1 or the method for manufacturing a welding rod described in patent literature 2, a welding rod is manufactured by the extruding method as described above and hence, an elongated welding rod made of a hard-to-work material can be manufactured.

PRIOR ART LITERATURE

Patent Literature

Patent Literature 1: JP-A-3-232904
Patent Literature 2: JP-A-2001-294906

SUMMARY OF THE INVENTION

Technical Problem

However, in the method for manufacturing a welding rod described in patent literature 1, a binder made of a polybutene binder (thermoplastic resin) is used and hence, an extruded formed body is brought into an extremely soft state by shrinking in the degreasing step. Further, in the method for manufacturing a welding rod described in patent literature 1, spheroidal alloy powder having a relatively large particle size (average particle size: 25 µm) is used as alloy powder and hence, a space existing between respective alloy powder particles is relatively large whereby the extruded formed body is relatively considerably shrunken in the course of carrying out the steps ranging from the degreasing step to the sintering step. Accordingly, the method for manufacturing a welding rod described in patent literature 1 has "a drawback (a) that cracks are liable to be generated in the extruded formed body or the extruded formed body is liable to be broken into fragments (torn into portions) in the course of carrying out the steps ranging from the degreasing step to the sintering step", and "a drawback (b) that straightness or circularity is liable to be deteriorated in the course of carrying out the steps ranging from the degreasing step to the sintering step".

Further, in the method for manufacturing a welding rod described in patent literature 1, as described above, spheroidal alloy powder having a relatively large particle size (average particle size: 25 µm) is used as alloy powder and hence, a space existing between respective alloy powder particles is relatively large. Accordingly, the method for manufacturing a welding rod described in patent literature 1 has, since sufficient sintering of alloy powder in the sintering step is not easy, "a drawback (c) that it is difficult to accurately control sintering density of a welding rod", and "a drawback (d) that pin holes are liable to be generated in the inside of bead when a welding rod is used in a welding operation".

Still further, in the method for manufacturing a welding rod described in patent literature 1, as described above, a binder made of a polybutene binder (thermoplastic resin) is used and hence, it is necessary to use a relatively large quantity of binder for preparing a compound having appropriate viscosity. Accordingly, it is not easy to sufficiently remove a binder component in the degreasing step and hence, carbon derived from a binder is liable to remain in the welding rod. As a result, the method for manufacturing a welding rod described in patent literature 1 has "a drawback (e) that it is difficult to accurately control a content of carbon in a welding rod".

Still further, in the method for manufacturing a welding rod described in patent literature 1, the sintering step is carried out under a vacuum atmosphere and hence, Cr is evaporated from an alloy component in the sintering step although a quantity of evaporated Cr is small. Accordingly, the method for manufacturing a welding rod described in patent literature 1 has "a drawback (f) that it is difficult to accurately control a content of Cr in a welding rod".

On the other hand, in the method for manufacturing a welding rod described in patent literature 2, atomized alloy powder having a relatively large particle size (for example, average particle size: 80 μm or less, see paragraph "0019" of patent literature 2) is used as alloy powder and hence, a space existing between respective alloy powder particles is relatively large whereby the extruded formed body is relatively considerably shrunken in the course of carrying out the steps ranging from the degreasing step to the sintering step. Accordingly, in the same manner as the method for manufacturing a welding rod described in patent literature 1, the method for manufacturing a welding rod described in patent literature 2 also has "a drawback (a) that cracks are liable to be generated in the extruded formed body or the extruded formed body is liable to be broken into fragments in the course of carrying out the steps ranging from the degreasing step to the sintering step", and "a drawback (b) that straightness or circularity is liable to be deteriorated in the course of carrying out the steps ranging from the degreasing step to the sintering step".

Further, in the method for manufacturing a welding rod described in patent literature 2, as described above, atomized alloy powder having a relatively large particle size (for example, average particle size: 80 μm or less) is used as alloy powder and hence, a space existing between respective alloy powder particles is relatively large. Accordingly, in the same manner as the method for manufacturing a welding rod described in patent literature 1, the method for manufacturing a welding rod described in patent literature 2 also has, since sufficient sintering of alloy powder in the sintering step is not easy, "a drawback (c) that it is difficult to accurately control sintering density of a welding rod", and "a drawback (d) that pin holes are liable to be generated in the inside of bead when a welding rod is used in a welding operation".

Still further, in the method for manufacturing a welding rod described in patent literature 2, the degreasing step is carried out at a relatively low temperature of 200° C. Accordingly, it becomes difficult to sufficiently remove a binder component in the degreasing step and hence, carbon derived from a binder is liable to remain in the welding rod. As a result, in the same manner as the method for manufacturing a welding rod described in patent literature 1, the method for manufacturing a welding rod described in patent literature 2 also has "a drawback (e) that it is difficult to accurately control a content of carbon in a welding rod".

With respect to the method for manufacturing a welding rod described in patent literature 2, the atmosphere under which the sintering step is carried out is not explicitly described in embodiments described in patent literature 2. However, by referencing paragraph [0031] of patent literature 2, also in the method for manufacturing a welding rod described in patent literature 2, it is estimated that the sintering step is carried out in a vacuum. If so, also in the method for manufacturing a welding rod described in patent literature 2, in the same manner as the method for manufacturing a welding rod described in patent literature 1, Cr is evaporated from an alloy component in the sintering step although a quantity of evaporated Cr is small. Accordingly, the method for manufacturing a welding rod described in patent literature 2 also has "a drawback (f) that it is difficult to accurately control a content of Cr in a welding rod".

That is, both the method for manufacturing a welding rod described in patent literature 1 and the method for manufacturing a welding rod described in patent literature 2 have six drawbacks, that is, "a drawback (a) that cracks are liable to be generated in the extruded formed body or the extruded formed body is liable to be broken into fragments in the course of carrying out the steps ranging from the degreasing step to the sintering step", "a drawback (b) that straightness or circularity is liable to be deteriorated in the course of carrying out the steps ranging from the degreasing step to the sintering step", "a drawback (c) that it is difficult to accurately control sintering density of a welding rod", "a drawback (d) that pin holes are liable to be generated in the inside of bead when a welding rod is used in a welding operation", "a drawback (e) that it is difficult to accurately control a content of carbon in a welding rod", and "a drawback (f) that it is difficult to accurately control a content of Cr in a welding rod". All these six drawbacks are extremely critical and serious drawbacks in the manufacture and the use of a welding rod. Inventors of the present invention consider that only when all these six drawbacks are solved, a method for manufacturing a welding rod by an extrusion method becomes a manufacturing method which is accepted by the markets of welding rods.

Such circumstances exist not only in the method for manufacturing a welding rod but also in a method for manufacturing a welding material in a wide range of welding materials including a tubular welding material.

The present invention has been made in view of the above-mentioned circumstances, and it is an object of the present invention to provide a method for manufacturing a welding rod which can overcome all six drawbacks consisting of "a drawback (a) that cracks are liable to be generated in the extruded formed body or the extruded formed body is liable to be broken into fragments in the course of carrying out the steps ranging from the degreasing step to the sintering step", "a drawback (b) that straightness or circularity is liable to be deteriorated in the course of carrying out the steps ranging from the degreasing step to the sintering step", "a drawback (c) that it is difficult to accurately control sintering density of a welding material", "a drawback (d) that pin holes are liable to be generated in the inside of bead when a welding material is used in a welding operation", "a drawback (e) that it is difficult to accurately control a content of carbon in a welding material", and "a drawback (f) that it is difficult to accurately control a content of Cr in a welding material".

Solution to Problems

[1] The present invention is directed to a method for manufacturing a welding material including in the order below: a compound preparing step in which a compound is prepared by mixing alloy powder containing first alloy powder having a first average particle size and second alloy powder having a second average particle size smaller than the first average particle size, a water soluble binder and water; an extruding step in which an extruded formed body is prepared by extruding the compound prepared in the compound preparing step from a forming nozzle; a degreasing step in which the binder component is removed from the extruded formed body prepared in the extruding step by heating the extruded formed body to a predetermined temperature of 400° C. or above under an inert gas atmosphere, a reducing gas atmosphere or a reduced pressure atmosphere; a C—O reaction step in which oxygen present on a surface of and in the inside of the alloy powder and carbon derived from the binder are removed by causing a reaction between oxygen and carbon by heating the extruded formed body from which the binder component is removed in the degreasing step to a predetermined temperature which falls within a range of 950° C. to 1150° C. in a vacuum; and a sintering step in which the extruded formed body from which oxygen present on the surface of and in the inside of the alloy powder and carbon derived from the binder are removed in the C—O reaction step is heated to a predetermined temperature which falls within a range of 1200° C. to 1350° C. under an inert gas atmosphere, a reducing gas atmosphere or "a mixed gas atmosphere made of an inert gas and a reducing gas" thus forming the welding material.

According to the method for manufacturing a welding material of the present invention, it is possible to overcome all of six drawbacks, that is, "a drawback (a) that cracks are liable to be generated in the extruded formed body or the extruded formed body is liable to be broken into fragments in the course of carrying out the steps ranging from the degreasing step to the sintering step", "a drawback (b) that straightness or circularity is liable to be deteriorated in the course of carrying out the steps ranging from the degreasing step to the sintering step", "a drawback (c) that it is difficult to accurately control sintering density of a welding material", "a drawback (d) that pin holes are liable to be generated in the inside of bead when a welding material is used in a welding operation", "a drawback (e) that it is difficult to accurately control a content of carbon in a welding material", and "a drawback (f) that it is difficult to accurately control a content of Cr in a welding material".

That is, according to the method for manufacturing a welding material of the present invention, with the use of the water-soluble binder, different from the case where the binder made of a thermoplastic resin is used, the binder is not softened even when the binder is heated so that the extruded formed body is shrunken without being deformed in the degreasing step. Further, according to the method for manufacturing a welding material of the present invention, with the use of the alloy powder containing first alloy powder having a first average particle size and second alloy powder having a second average particle size smaller than the first average particle size as alloy powder, a space existing between the respective alloy powder particles can be made smaller than the corresponding spaces in the invention described in patent literature 1 and in the invention described in patent literature 2 and hence, a shrinkage quantity of the extruded formed body in the course of carrying out steps ranging from the degreasing step to the sintering step can be made smaller than the corresponding shrinkage quantity in the invention described in patent literature 1 and in the invention described in patent literature 2. Accordingly, the method for manufacturing a welding material of the present invention can overcome "a drawback (a) that cracks are liable to be generated in the extruded formed body or the extruded formed body is liable to be broken into fragments in the course of carrying out the steps ranging from the degreasing step to the sintering step", and "a drawback (b) that straightness or circularity is liable to be deteriorated in the course of carrying out the steps ranging from the degreasing step to the sintering step".

Further, according to the method for manufacturing a welding material of the present invention, as described above, with the use of the alloy powder containing first alloy powder having a first average particle size and second alloy powder having a second average particle size smaller than the first average particle size as alloy powder, a space existing between the respective alloy powder particles can be made smaller than the corresponding spaces in the invention described in patent literature 1 and in the invention described in patent literature 2. Therefore, according to the method for manufacturing a welding material of the present invention, sinterability of alloy powder can be enhanced so that sintering density can be increased by sufficiently sintering alloy powder whereby the method for manufacturing a welding material of the present invention can overcome "a drawback (c) that it is difficult to accurately control sintering density of a welding material", and "a drawback (d) that pin holes are liable to be generated in the inside of a bead when a welding material is used in a welding operation".

Further, according to the method for manufacturing a welding material of the present invention, as described above, with the use of the alloy powder containing first alloy powder having a first average particle size and second alloy powder having a second average particle size smaller than the first average particle size as alloy powder, a space existing between the respective alloy powder particles can be made small and hence, a quantity of using binder can be made smaller. Further, according to the method for manufacturing a welding material of the present invention, the degreasing step is carried out by heating the extruded formed body to a predetermined temperature of 400° C. or above. Accordingly, a binder component can be sufficiently removed in the degreasing step so that carbon derived from a binder remaining in a welding material can be decreased to an extremely low level. As a result, the method for manufacturing a welding material of the present invention can overcome "a drawback (e) that it is difficult to accurately control a content of carbon in a welding material". Further, according to the method for manufacturing a welding material of the present invention, a quantity of using binder can be made smaller and hence, the method for manufacturing a welding material of the present invention can also acquire an advantageous effect that a shrinkage quantity of the extruded formed body in steps ranging from the degreasing step to the sintering step can be decreased, an advantageous effect that shape retentivity can be enhanced, and an advantageous effect that a time for the degreasing step can be shortened.

Further, according to the method for manufacturing a welding material of the present invention, the sintering step is carried out under an inert gas atmosphere or a reducing gas atmosphere and hence, there is no possibility that Cr is evaporated from an alloy component in the sintering step. As a result, the method for manufacturing a welding material of the present invention can overcome "a drawback (f) that it is difficult to accurately control a content of Cr in a welding material".

In the method for manufacturing a welding material where the welding material is manufactured from alloy powder, a manufactured welding material unavoidably contains oxygen at certain concentration due to the presence of oxygen which is originally contained in an alloy powder raw material, the presence of oxygen which gets into alloy powder at the time of manufacturing alloy powder, and the presence of oxygen which gets into in mixing step, molding step or the like. Under such a state, in the method for manufacturing a welding material of the present invention, the sintering step is carried out not under a vacuum atmosphere but under an inert gas atmosphere or a reducing gas atmosphere and hence, it is considered that oxygen present on a surface of and in the inside of alloy powder cannot be sufficiently removed.

However, according to the method for manufacturing a welding material of the present invention, between the degreasing step and the sintering step, the C—O reaction step is carried out in such a manner that oxygen present on a surface of and in the inside of the alloy powder and carbon derived from the binder are removed by causing a reaction between oxygen and carbon by heating the extruded formed body to a predetermined temperature which falls within a range of 950° C. to 1150° C. under a vacuum atmosphere. Accordingly, oxygen present on a surface of and in the inside of alloy powder can be sufficiently removed. As a result, there is no possibility that sintering density is lowered because of the oxygen present on a surface of or in the inside of alloy powder.

Further, according to the method for manufacturing a welding material of the present invention, oxygen present on a surface of and in the inside of alloy powder can be sufficiently removed and hence, a welding material having a content of oxygen lower than a content of oxygen in alloy powder can be manufactured. As a result, the method for manufacturing a welding material of the present invention can acquire an advantageous effect that weldability is enhanced when welding is carried out, an advantageous effect that strength of a welded part (bead) can be enhanced when welding is carried out, and also an advantageous effect that toughness of the welded part (bead) is enhanced when welding is carried out.

In the method for manufacturing a welding material of the present invention, the above-mentioned C—O reaction step is carried out between the degreasing step and the sintering step. In the C—O reaction step, a temperature of the extruded heated body is elevated to a temperature no higher than a predetermined temperature which falls within a range of 950° C. to 1150° C. and hence, it is possible to suppress a quantity of Cr evaporated from an alloy component in the C—O reaction step at an extremely low level.

The reason the C—O reaction step is carried out by heating the extruded formed body to a predetermined temperature which falls within a range of 950° C. to 1150° C. is that a sufficient C—O reaction is not generated when the extruded formed body is not heated to a temperature of 950° C. or above, while it becomes difficult to suppress a quantity of Cr evaporated from an alloy component in the C—O reaction step at an extremely low level when the extruded formed body is heated to a temperature above 1150° C.

In the above-mentioned respective steps, in measuring a temperature of the extruded formed body, a temperature of an outer peripheral portion of the extruded formed body is measured using a thermocouple or a radiation thermometer.

[2] In the method for manufacturing a welding material according to the present invention, in the C—O reaction step, the predetermined temperature preferably falls within a range of 1000° C. to 1100° C.

By adopting such a method, it becomes possible to sufficiently remove oxygen present on a surface of and in the inside of alloy powder while suppressing an evaporation quantity of Cr at an extremely low level.

[3] In the method for manufacturing a welding material according to the present invention, in the C—O reaction step, it is preferable that the extruded formed body is heated to the predetermined temperature and, thereafter, is kept at the predetermined temperature until a degree of vacuum reaches a predetermined degree of vacuum which falls within a range of $1 \times 10^{-4}$ Pa to 20 Pa.

When the extruded formed body is heated to the above-mentioned predetermined temperature, oxygen remaining on a surface of and in the inside of alloy powder reacts with carbon derived from a binder and hence, CO or $CO_2$ is generated whereby the degree of vacuum is lowered (or a pressure is increased) temporarily. However, when the extruded formed body is held at a predetermined temperature for a predetermined time, along with the consumption of oxygen remaining on a surface of and in the inside of alloy powder and carbon derived from a binder, a generation quantity of CO or $CO_2$ is decreased, and the degree of vacuum is increased with time. Accordingly, by adopting such a method, a quantity of oxygen remaining in alloy powder can be sufficiently reduced.

In this case, the reason the predetermined degree of vacuum is set to a value which falls within a range of $1 \times 10^{-4}$ Pa to 20 Pa is that when the pressure is higher than 20 Pa, there exists a case where oxygen cannot be sufficiently removed in the C—O reaction step (particularly at a core portion of the extruded formed body), while an oxygen removing effect cannot be increased so much even when the pressure is lowered to a value smaller than $1 \times 10^{-4}$ Pa.

[4] In the method for manufacturing a welding material according to the present invention, the sintering step is preferably carried out under a nitrogen gas atmosphere, an ammonia-cracked gas atmosphere or "a mixed gas atmosphere made of a nitrogen gas and a hydrogen gas".

Different from a noble gas such as an argon gas, a nitrogen gas (also including a nitrogen gas derived from an ammonia-cracked gas) is melted into alloy (present in a solid solution state in an alloy matrix) in a high temperature state. Accordingly, by adopting such a method, the method for manufacturing a welding material according to the present invention can overcome "a drawback (d) that pin holes are liable to be generated in the inside of bead when a welding material is used in a welding operation" at a more sophisticated level.

Further, a nitrogen gas (also including a nitrogen gas derived from an ammonia-cracked gas) has a larger heat capacity than a noble gas such as an argon gas and hence, the nitrogen gas can increase sintering density compared to a noble gas such as an argon gas. Further, the sintering step using a nitrogen gas can be carried out at a lower temperature than the sintering step using a noble gas such as an argon gas so that a manufacturing cost can be reduced.

Further, when the sintering step is carried out under an ammonia-cracked gas atmosphere or "a mixed gas atmosphere made of a nitrogen gas and a hydrogen gas", due to an action of a hydrogen gas derived from the ammonia-cracked gas or a hydrogen gas contained in the mixed gas, oxygen which may remain on a surface of and in the inside of the alloy powder can be removed further completely and hence, sintering density of the extruded formed body can be further increased. It is also possible to manufacture a welding material having further improved weldability.

[5] In the method for manufacturing a welding material according to the present invention, the first average particle size preferably falls within a range of 20 μm to 100 μm, and the second average particle size preferably falls within a range of 1 μm to 20 μm.

By adopting such a method, second alloy powder particles smoothly enter gaps formed between the respective first alloy powder particles so that a space existing between the respective alloy powder particles can be made small.

[6] In the method for manufacturing a welding material according to the present invention, it is preferable that assuming a mixing quantity of the first alloy powder in the compound as A and a mixing quantity of the second alloy powder in the compound as B, a relationship of "60%≤A/(A+B)≤95%" is satisfied.

By adopting such a method, second alloy powder particles smoothly enter gaps formed between the respective first alloy powder particles so that a space existing between the respective alloy powder particles can be made small. The reason the establishment of the relationship of "60%≤A/(A+B)≤95%" is set as the requirement is that when A/(A+B) exceeds 95%, a quantity of second alloy powder is extremely small so that second alloy powder particles cannot sufficiently enter gaps formed between the respective first alloy powder particles, while when A/(A+B) is less than 60%, a quantity of second alloy powder having a small average particle size and thus having a large specific surface area is excessive so that it becomes not easy to reduce a content of oxygen contained in a welding material. Further, an operation at the time of preparing a compound and an operation at the time of handling the compound become cumbersome.

[7] In the method for manufacturing a welding material according to the present invention, it is preferable that the first alloy powder is alloy powder manufactured by a gas atomizing method, and the second alloy powder is alloy powder manufactured by a water atomizing method.

First alloy powder having the average particle size which falls within a range of 20 μm to 100 μm can be easily manufactured by a gas atomizing method. On the other hand, second alloy powder having the average particle size which falls within a range of 1 μm to 20 μm can be easily manufactured by a water atomizing method.

Further, in the method for manufacturing a welding material according to the present invention, first alloy powder is manufactured by a gas atomizing method having a tendency where an average particle size becomes relatively large while relatively lowering a content of oxygen and second alloy powder is manufactured by a water atomizing method having a tendency where a content of oxygen becomes relatively high while making an average particle size relatively small. Accordingly, an average particle size of alloy powder containing first alloy powder and second alloy powder can be made relatively small while setting a content of oxygen in the alloy powder relatively low.

[8] In the method for manufacturing a welding material according to the present invention, a rate of the binder contained in the compound preferably falls within a range of 1.5 parts by weight to 5.5 parts by weight with respect to 100 parts by weight of the alloy powder.

The reason a rate of the binder is set to a value which falls within a range of 1.5 parts by weight to 5.5 parts by weight with respect to 100 parts by weight of the alloy powder is that when the rate of the binder with respect to 100 parts by weight of the alloy powder exceeds 5.5 parts by weight, a quantity of the binder is excessively large and hence, it becomes not easy to sufficiently remove the binder contained in the degreasing step, while when the rate of the binder with respect to 100 parts by weight of the alloy powder is less than 1.5 parts by weight, a quantity of the binder is excessively small so that formability is lowered whereby the extruding step cannot be carried out smoothly.

From these points of view, it is more preferable that the rate of the binder contained in the compound falls within a range of 2 parts by weight to 3.5 parts by weight with respect to 100 parts by weight of the alloy powder.

In the method for manufacturing a welding material according to the present invention, it is more preferable that a rate of water contained in the compound to a value falls within a range of 1 part by weight to 11 parts by weight with respect to 100 parts by weight of the alloy powder.

The reason the rate of water is set to a value which falls within a range of 1 part by weight to 11 parts by weight with respect to 100 parts by weight of alloy powder is that when the rate of water with respect to 100 parts by weight of alloy powder exceeds 11 parts by weight, a quantity of the water is excessively large and hence, shape retentivity of the extruded formed body is lowered in the extruding step and the drying step while when the rate of water with respect to 100 parts by weight of the alloy powder is less than 1 part by weight, a quantity of water is excessively small so that formability is lowered whereby the extruding step cannot be carried out smoothly.

From these points of view, it is more preferable that the rate of water contained in the compound falls within a range of 2 parts by weight to 7 parts by weight with respect to 100 parts by weight of the alloy powder.

[9] In the method for manufacturing a welding material according to the present invention, the extruding step is preferably carried out using a compound whose viscosity measured by a flow characteristic tester (capirograph) falls within a range of 1.8 P (poise) to 2.5 P (poise).

The reason viscosity measured by a flow characteristic tester (capirograph) is set to a value which falls within a range of 1.8 P (poise) to 2.5 P (poise) is that when viscosity exceeds 2.5 P (poise), viscosity is excessively large so that formability of the extruded formed body is lowered whereby the extruding step cannot be carried out smoothly, while when viscosity is less than 1.8 P (poise), viscosity is excessively low so that shape retentivity of the extruded formed body is lowered.

[10] In the method for manufacturing a welding material according to the present invention, it is preferable that in the extruding step, the extruded formed body extruded from the forming nozzle is cut into extruded members of a fixed size using "a take-out/cutting device" which is operated in synchronism with an extruding speed of the extruded formed body, and the extruded members are sequentially placed on a receiving member.

By adopting such a method, a possibility that cracks are generated in the extruded formed body or the extruded formed body is broken into fragments in the course of carrying out the extruding step is removed. Further, the extruded formed body can be sequentially placed on the receiving member smoothly.

[11] In the method for manufacturing a welding material according to the present invention, the degreasing step is preferably carried out under a reduced pressure atmosphere which is formed by reducing pressure in the atmosphere while introducing an inert gas or a reducing gas into the atmosphere.

By adopting such a method, it becomes possible to prevent a surface of alloy powder from being oxidized in the degreasing step as much as possible. A binder component can be more sufficiently removed in the degreasing step so that carbon derived from a binder remaining in a welding material can be decreased to an extremely low level.

[12] In the method for manufacturing a welding material according to the present invention, the method for manufacturing a welding material preferably further includes, between the extruding step and the degreasing step, a drying step in which the extruded formed body prepared in the extruding step is dried by gradually elevating a temperature of the extruded formed body from a first temperature which falls within a range of 5° C. to 40° C. to a second temperature which falls within a range of 60° C. to 100° C. under an inert gas atmosphere, a reducing gas atmosphere or a reduced pressure atmosphere.

By adopting such a method, moisture can be sufficiently removed from the extruded formed body before carrying out the degreasing step while preventing the generation of cracks as much as possible.

[13] The present invention is directed to a welding material which is manufactured by the method for manufacturing a welding material according to the present invention, wherein a content of oxygen in the welding material is lower than a content of oxygen in the alloy powder.

[14] In the welding material of the present invention which is manufactured by the method for manufacturing a welding material according to the present invention, a content of oxygen is 0.08 weight % or less.

In the welding material of the present invention, a content of oxygen in the welding material is lower than a content of oxygen in alloy powder so that the content of oxygen in the welding material is extremely low whereby the welding material possesses high sintering density and excellent weldability. Further, the welding material of the present invention becomes a welding material with which a welded product having high strength and toughness at a welded portion (bead) can be manufactured.

In the welding material of the present invention, a content of oxygen may preferably be 0.05 weight % or less, and the oxygen content may preferably be 0.02 weight % or less.

The welding material of the present invention may be a rod-shaped welding material (welding rod), or a tubular welding material (welding tube). When the welding material of the present invention is a tubular welding material, a flux can be put into a center hole of the tubular welding material so that welding operation can be carried out with high operability. Further, a profile of the welding material of the present invention may be a circular shape or shapes other than the circular shapes (for example, a triangular shape, a quadrangular shape, a pentagonal shape, a hexagonal shape or other polygonal shapes).

BRIEF DESCRIPTION OF DRAWINGS

[FIG. 4]
A table showing a result of evaluation obtained with respect to an example 1, an example 2, a comparison example 1 and a comparison example 2.

DESCRIPTION OF EMBODIMENTS

Hereinafter, a method for manufacturing a welding material according to the present invention is explained in detail in conjunction with embodiments.

Figure 1:
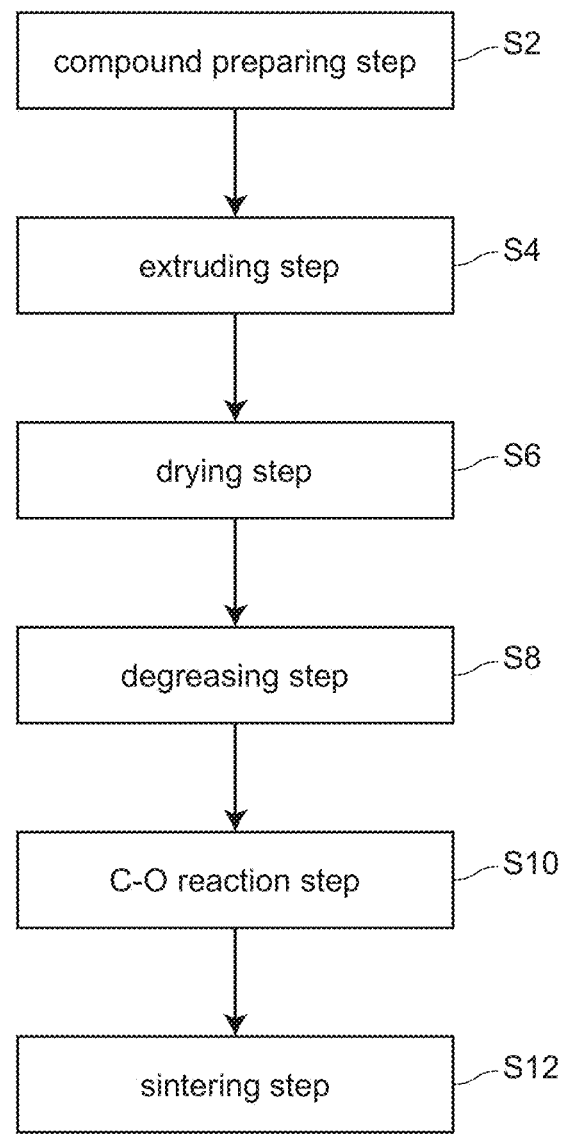
[FIG. 1]
A flowchart for explaining a method for manufacturing a welding material according to an embodiment.

[Embodiment]
FIG. 1 is a flowchart for explaining a method for manufacturing a welding material according to the embodiment. As shown in FIG. 1, the method for manufacturing a welding material of the embodiment includes: a compound preparing step S2; an extruding step S4; a drying step S6; a degreasing step S8; a C—O reaction step S10; and a sintering step S12 in this order. Hereinafter, the method for manufacturing a welding material of the embodiment is explained in the order of steps.

1. Compound Preparing Step S2

The compound preparing step S2 is a step where a compound is prepared by mixing alloy powder containing first alloy powder having a first average particle size and second alloy powder having a second average particle size smaller than the first average particle size, a water soluble binder and water.

The alloy powder is made of a Stellite alloy, for example. The first average particle size of the first alloy powder falls within a range of 20 μm to 100 μm, and the second average particle size of the second alloy powder falls within a range of 1 μm to 20 μm. With respect to the alloy powder, assuming a mixing quantity of the first alloy powder in the compound as A and a mixing quantity of the second alloy powder in the compound as B, a relationship of "$60\% \leq A/(A+B) \leq 95\%$" is satisfied. The first alloy powder is alloy powder manufactured by a gas atomizing method, for example, and the second alloy powder is alloy powder manufactured by a water atomizing method, for example.

The binder is a water soluble binder (alkyl-cellulose-based binder, for example). A rate of the binder contained in the compound falls within a range of 1.5 parts by weight to 5.5 parts by weight with respect to 100 parts by weight of the alloy powder. Further, a rate of water contained in the compound falls within a range of 1 part by weight to 11 parts by weight with respect to 100 parts by weight of the alloy powder. The component other than a binder and water (alcohol/glycol, acid or the like) may be contained in the compound.

2. Extruding Step S4

The extruding step S4 is a step where an extruded formed body is prepared by extruding the compound prepared in the compound preparing step S2 from a forming nozzle.

The extruding step S4 is carried out using a compound whose viscosity measured by a flow characteristic tester (capirograph) falls within a range of 1.8 P (poise) to 2.5 P (poise). In the extruding step S4, the extruded formed body extruded from the forming nozzle is cut into extruded members of a fixed size using "a take-out/cutting device" which is operated in synchronism with an extruding speed of the extruded formed body, and the extruded members are sequentially placed on a receiving member.

3. Drying Step S6

The drying step S6 is a step where the extruded formed body prepared in the extruding step is dried by gradually elevating a temperature of the extruded formed body from a first temperature which falls within a range of 5° C. to 40° C. to a second temperature which falls within a range of 60° C. to 100° C. under an inert gas atmosphere, a reducing gas atmosphere or a reduced pressure atmosphere. The temperature of the extruded formed body may be elevated spending a relatively long time (for example, 2 hours or more) in a state where the extruded formed body stands still or the temperature of the extruded formed body may be elevated spending a relatively short time (for example, approximately 10 minutes) while rotating the extruded formed body. The extruded formed body may be naturally dried for one day or several days before the drying step S6 is carried out.

4. Degreasing Step S8

The degreasing step S8 is a step where the binder component is removed from the extruded formed body by heating the extruded formed body which is prepared in the extruding step S4 and is dried in the drying step S6 to a predetermined temperature of 400° C. or above under an inert gas atmosphere, a reducing gas atmosphere or a reduced pressure atmosphere.

The degreasing step S8 may be carried out under a reduced pressure atmosphere which is formed by reducing pressure in the atmosphere while introducing an inert gas or a reducing gas into the atmosphere.

5. C—O Reaction Step S10

The C—O reaction step S10 is a step where oxygen present on a surface of and in the inside of the alloy powder and carbon derived from the binder are removed by causing a reaction between oxygen and carbon by heating the extruded formed body from which the binder component is removed in the degreasing step S8 to a predetermined temperature which falls within a range of 950° C. to 1150° C. (more preferably falls within a range of 1000° C. to 1100° C.) under a vacuum atmosphere. In the C—O reaction step S10, for example, the extruded formed body is heated to the above-mentioned predetermined temperature and, thereafter, is kept at such a predetermined temperature until a degree of vacuum reaches a predetermined degree of vacuum which falls within a range of $1 \times 10^{-4}$ Pa to 20 Pa.

6. Sintering Step S12

The sintering step S12 is a step where the extruded formed body from which oxygen present on the surface of and in the inside of the alloy powder and carbon derived from the binder are removed in the C—O reaction step S10 is heated to a predetermined temperature which falls within a range of 1200° C. to 1350° C. under an inert gas atmosphere, a reducing gas atmosphere or "a mixed gas atmosphere made of an inert gas and a reducing gas" thus forming the welding material. It is particularly preferable to carry out the sintering step S12 under a nitrogen atmosphere (pressure: for example, 0.5 atmospheric pressure to 2 atmospheric pressure). Different from a noble gas such as an argon gas, a nitrogen gas is melted into an alloy (present in a solid solution state in an alloy matrix) in a high temperature state and hence, pin holes are hardly generated in the inside of a bead when a welding material is used in a welding operation. Further, the reason the pressure is set to a value which falls within a range of 0.5 to 2 atmospheric pressure is that when the pressure becomes below 0.5 atmospheric pressure, Cr becomes liable to be evaporated from an alloy component in the sintering step S12, while when the pressure exceeds 2 atmospheric pressure, nitrogen is excessively contained in an alloy component in the sintering step S12.

The welding material according to the embodiment can be manufactured through the above-mentioned steps.

3. Advantageous Effect of Method for Manufacturing Welding Material According to Embodiment According to the method for manufacturing a welding material of the embodiment, it is possible to overcome all of six drawbacks, that is, "a drawback (a) that cracks are liable to be generated in the extruded formed body or the extruded formed body is liable to be broken into fragments in the course of carrying out the steps ranging from the degreasing step to the sintering step", "a drawback (b) that straightness or circularity is liable to be deteriorated in the course of carrying out the steps ranging from the degreasing step to the sintering step", "a drawback (c) that it is difficult to accurately control sintering density of a welding material", "a drawback (d) that pin holes are liable to be generated in the inside of bead when a welding material is used in a welding operation", "a drawback (e) that it is difficult to accurately control a content of carbon in a welding material", and "a drawback (f) that it is difficult to accurately control a content of Cr in a welding material".

That is, according to the method for manufacturing a welding material of the embodiment, with the use of the water-soluble binder, different from the case where the binder made of a thermoplastic resin is used, the binder is not softened even when the binder is heated so that the extruded formed body in a hard state is shrunken in the degreasing step. Further, according to the method for manufacturing a welding material of the embodiment, with the use of the alloy powder containing first alloy powder having a first average particle size and second alloy powder having a second average particle size smaller than the first average particle size as alloy powder, a space existing between the respective alloy powder particles can be made smaller than the corresponding spaces in the invention described in patent literature 1 and in the invention described in patent literature 2 and hence, a shrinkage quantity of the extruded formed body in steps ranging from the degreasing step to the sintering step can be made smaller than the corresponding shrinkage quantity in the invention described in patent literature 1 and in the invention described in patent literature 2. Accordingly, the method for manufacturing a welding material of the embodiment can overcome "a drawback (a) that cracks are liable to be generated in the extruded formed body or the extruded formed body is liable to be broken into fragments in the course of carrying out the steps ranging from the degreasing step to the sintering step", and "a drawback (b) that straightness or circularity is liable to be deteriorated in the course of carrying out the steps ranging from the degreasing step to the sintering step".

Further, according to the method for manufacturing a welding material of the embodiment, as described above, with the use of the alloy powder containing first alloy powder having a first average particle size and second alloy powder having a second average particle size smaller than the first average particle size as alloy powder, a space existing between the respective alloy powder particles can be made smaller than the corresponding spaces in the invention described in patent literature 1 and in the invention described in patent literature 2. Therefore, according to the method for manufacturing a welding material of the embodiment, sinterability of alloy powder can be enhanced so that sintering density can be increased by sufficiently sintering alloy powder whereby the method for manufacturing a welding material of the embodiment can overcome "a drawback (c) that it is difficult to accurately control sintering density of a welding material", and "a drawback (d) that pin holes are liable to be generated in the inside of bead when a welding material is used in a welding operation".

Further, according to the method for manufacturing a welding material of the embodiment, as described above, with the use of the alloy powder containing first alloy powder having a first average particle size and second alloy powder having a second average particle size smaller than the first average particle size as alloy powder, a space existing between the respective alloy powder particles can be made small and hence, a quantity of using binder can be made smaller. Further, according to the method for manufacturing a welding material of the embodiment, the degreasing step is carried out by heating the extruded formed body to a predetermined temperature of 400° C. or above. Accordingly, a binder component can be sufficiently removed in the degreasing step so that carbon derived from a binder remaining in a welding material can be decreased to an extremely low level. As a result, the method for manufacturing a welding material of the embodiment can overcome "a drawback (e) that it is difficult to accurately control a content of carbon in a welding material". Further, according to the method for manufacturing a welding material of the embodiment, a quantity of using binder can be made smaller and hence, the method for manufacturing a welding material of the embodiment can also acquire an advantageous effect that a shrinkage quantity of the extruded formed body in steps ranging from the degreasing step to the sintering step can be decreased, an advantageous effect that shape retentivity can be enhanced, and an advantageous effect that a time for the degreasing step can be shortened.

Further, according to the method for manufacturing a welding material of the embodiment, the sintering step is carried out under an inert gas atmosphere, a reducing gas atmosphere or "a mixed gas atmosphere made of an inert gas and a reducing gas" and hence, a possibility that Cr is evaporated from an alloy component in the sintering step is removed. As a result, the method for manufacturing a welding material of the embodiment can overcome "a drawback (f) that it is difficult to accurately control a content of Cr in a welding material".

Further, according to the method for manufacturing a welding material of the embodiment, between the degreasing step and the sintering step, the C—O reaction step is carried out in such a manner that oxygen present on a surface of and in the inside of the alloy powder and carbon derived from the binder are removed by causing a reaction between oxygen and carbon by heating the extruded formed body to a predetermined temperature which falls within a range of 950° C. to 1150° C. under a vacuum atmosphere. Accordingly, oxygen present on a surface of and in the inside of alloy powder can be sufficiently removed. As a result, there is no possibility that sintering density is lowered because of oxygen present on a surface of or in the inside of alloy powder.

Further, according to the method for manufacturing a welding material of the embodiment, oxygen present on a surface of and in the inside of alloy powder can be sufficiently removed and hence, a welding material having a content of oxygen lower than a content of oxygen in alloy powder can be manufactured. As a result, the method for manufacturing a welding material of the embodiment can acquire an advantageous effect that weldability is enhanced when welding is carried out, an advantageous effect that strength of a welded part (bead) can be enhanced when welding is carried out, and also an advantageous effect that toughness of the welded part (bead) is enhanced when welding is carried out.

Further, according to the method for manufacturing a welding material of the embodiment, in the C—O reaction step, the extruded formed body is heated to the predetermined temperature and, thereafter, is kept at such a predetermined temperature until a degree of vacuum reaches a predetermined degree of vacuum which falls within a range of $1 \times 10^{-4}$ Pa to 20 Pa. Accordingly, oxygen present on a surface of and in the inside of alloy powder and carbon derived from a binder can be sufficiently removed.

Further, when the sintering step is carried out under a nitrogen gas atmosphere, an ammonia-cracked gas atmosphere or "a mixed gas atmosphere made of a nitrogen gas and a hydrogen gas", different from a noble gas such as an argon gas, a nitrogen gas is melted into an alloy (present in a solid solution state in an alloy matrix) in a high temperature state. Accordingly, the method for manufacturing a welding material according to the embodiment can overcome "a drawback (d) that pin holes are liable to be generated in the inside of bead when a welding material is used in a welding operation" at a more sophisticated level.

Further, when the sintering step is carried out under a nitrogen gas atmosphere, an ammonia-cracked gas atmosphere or "a mixed gas atmosphere made of a nitrogen gas and a hydrogen gas", a nitrogen gas has a larger heat capacity than a noble gas such as an argon gas and hence, the nitrogen gas can increase sintering density compared to a noble gas such as an argon gas. As a result, the method for manufacturing a welding material according to the embodiment can overcome "a drawback (d) that pin holes are liable to be generated in the inside of bead when a welding material is used in a welding operation" at a more sophisticated level. Further, it becomes possible to lower a sintering temperature in the sintering step so that a manufacturing cost can be reduced.

Further, according to the method for manufacturing a welding material of the embodiment, the first average particle size falls within a range of 20 μm to 100 μm, and the second average particle size falls within a range of 1 μm to 20 μm. Accordingly, second alloy powder particles smoothly enter gaps formed between the respective first alloy powder particles so that a space existing between the respective alloy powder particles can be made small.

Further, according to the method for manufacturing a welding material of the embodiment, assuming a mixing quantity of the first alloy powder in the compound as A and a mixing quantity of the second alloy powder in the compound as B, a relationship of "$60\% \leq A/(A+B) \leq 95\%$" is satisfied. Accordingly, second alloy powder particles smoothly enter gaps formed between the respective first alloy powder particles so that a space existing between the respective alloy powder particles can be made small.

Further, according to the method for manufacturing a welding material of the embodiment, the first alloy powder is alloy powder manufactured by a gas atomizing method, and the second alloy powder is alloy powder manufactured by a water atomizing method. Accordingly, first alloy powder and second alloy powder can be easily manufactured.

Further, according to the method for manufacturing a welding material of the embodiment, a rate of the binder contained in the compound falls within a range of 1.5 parts by weight to 5.5 parts by weight with respect to 100 parts by weight of the alloy powder, and a rate of water contained in the compound falls within a range of 1 part by weight to 11 parts by weight with respect to 100 parts by weight of the alloy powder. Accordingly, a binder component and water can be sufficiently removed in the drying step and the degreasing step, and the extruding step can be carried out with high formability.

Further, according to the method for manufacturing a welding material of the embodiment, the extruding step is carried out using a compound whose viscosity measured by a flow characteristic tester (capirograph) falls within a range of 1.8 P (poise) to 2.5 P (poise). Accordingly, a binder component and water can be sufficiently removed in the steps ranging from the drying step to the degreasing step, and the extruding step can be carried out with high formability.

Further, according to the method for manufacturing a welding material of the embodiment, in the extruding step, the extruded formed body extruded from the forming nozzle is cut into extruded members of a fixed size using "a take-out/cutting device" which is operated in synchronism with an extruding speed of the extruded formed body, and the extruded members are sequentially placed on a receiving member. Accordingly, a possibility that cracks are generated in the extruded formed body or the extruded formed body is broken into fragments in the course of carrying out the extruding step is removed. Further, the extruded formed body can be sequentially placed on the receiving member smoothly.

Further, according to the method for manufacturing a welding material of the embodiment, the degreasing step is carried out under an inert gas atmosphere, a reducing gas atmosphere or a reduced pressure atmosphere. Accordingly, it becomes possible to prevent a surface of alloy powder from being oxidized as much as possible.

Further, according to the method for manufacturing a welding material of the embodiment, the degreasing step is carried out under a reduced pressure atmosphere which is formed by reducing pressure in the atmosphere while introducing an inert gas or a reducing gas into the atmosphere. Accordingly, a binder component can be more sufficiently removed in the degreasing step so that carbon derived from a binder remaining in a welding material can be decreased to an extremely low level.

Further, according to the method for manufacturing a welding material of the embodiment, the method for manufacturing a welding material further includes, between the extruding step and the degreasing step, a drying step in which the extruded formed body prepared in the extruding step is dried by gradually elevating a temperature of the extruded formed body from a first temperature which falls within a range of 5° C. to 40° C. to a second temperature which falls within a range of 60° C. to 100° C. under an inert gas atmosphere, a reducing gas atmosphere or a reduced pressure atmosphere. Accordingly, moisture can be sufficiently removed from the extruded formed body before carrying out the degreasing step while preventing the generation of cracks as much as possible.

EXAMPLE

In this example, a welding material is manufactured in accordance with the following method.

1. Compound Preparing Step S2

A compound is prepared using a raw material shown in the following Table 1.

TABLE 1

| Raw material: | content |
|---|---|
| First alloy powder (Stellite No. 6 counterpart): | 85.5 weight % |
| Second alloy powder (Stellite No. 6 counterpart): | 9.5 weight % |
| methylcellulose-based binder: | 2.5 weight % |
| ethylene glycol: | 0.25 weight % |
| boric acid: | 0.25 weight % |
| water: | 2.0 weight % |

That is, firstly, 95 Kg of alloy powder (made by Daido Steel Co., Ltd., product name: DAPKCW2, lot number: 02K1043) is prepared. Here, alloy powder is obtained by mixing first alloy powder manufactured by a gas atomizing method (average particle size: 45 µm, particle size distribution (2σ): 10 µm to 75 µm) and second alloy powder manufactured by a water atomizing method (average particle size: 10 µm, particle size distribution (2σ): 1 µm to 25 µm) at a rate of 90 parts by weight and 10 parts by weight.

Next, 5.0 Kg of aqueous binder is prepared by mixing 2 Kg of water, 2.5 Kg of methylcellulose (made by Shin-Etsu Chemical Co., Ltd.), 0.25 Kg of commercially available ethylene glycol, and 0.25 Kg of commercially available boric acid at a temperature of 20° C. or below.

Next, a compound is prepared by mixing 95 Kg of alloy powder and 5 Kg of aqueous binder using a pressure kneader (30 L made by MORIYAMA COMPANY LTD.). Thereafter, the compound is formed into a compound in a pellet shape using a pelletizer (obtained by partially remodeled "type: FRP-V32S" made by Meisei Metal Industry Co., Ltd.).

2. Extruding Step S4

Next, the compound in a pellet shape manufactured in the compound preparing step S2 is put into a hopper of an extruding forming device (made by UNIVERSE Co., Ltd., type: V-553), and the compound is sufficiently mixed while performing defoaming in vacuum, and the compound is extruded from a forming nozzle thus preparing the extruded formed body. The prepared extruded formed body has a columnar shape having a diameter of 4.2 mm and a length of 1000 mm.

The extruding step S4 is carried out using a compound whose viscosity measured by a flow characteristic tester (capirograph (made by Toyo Seiki Seisaku-sho, Ltd.)) falls within a range of 1.8 P (poise) to 2.5 P (poise).

Figure 2:
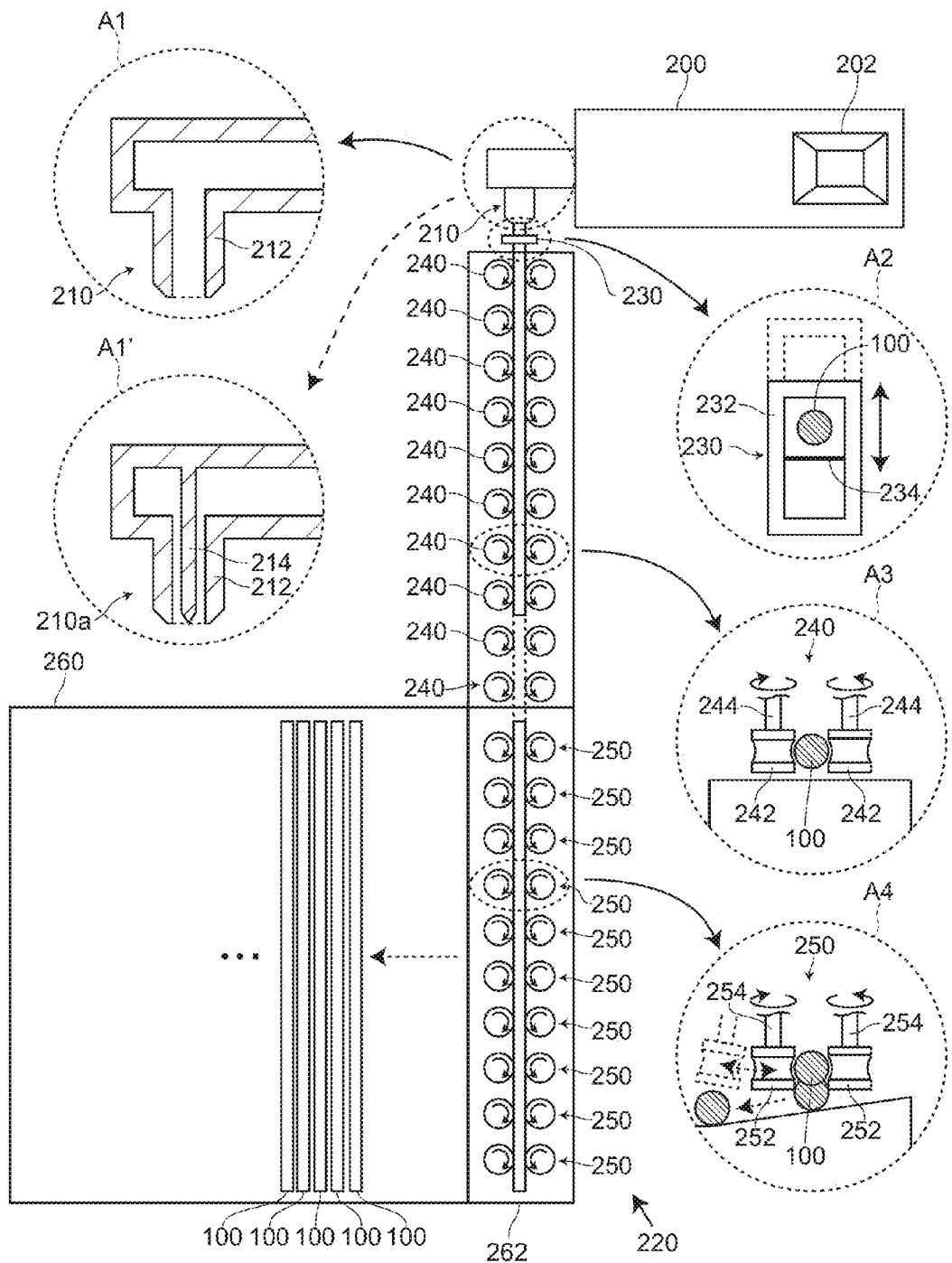
[FIG. 2]
A view for explaining an "extruding step" out of respective steps of the method for manufacturing a welding material according to an example.

FIG. 2 is a view for explaining the "extruding step" out of respective steps of the method for manufacturing a welding material according to the example. In FIG. 2, symbol 100 indicates an extruded formed body, symbol 200 indicates an extruding forming device, symbol 202 indicates a hopper, symbol 210 indicates a forming nozzle, symbol 210a indicates a forming nozzle (modification) described later, symbol 212 indicates an outer sleeve of the forming nozzle, symbol 214 indicates a pipe forming core described later, symbol 220 indicates a "take-out/cutting device", symbol 230 indicates a cutting device, symbol 232 indicates an outer frame of the cutting device 230, symbol 234 indicates a cutter made of a metal wire, symbol 240 indicates first roller devices which feed the extruded formed body 100, symbol 242 indicates rollers, symbol 244 indicates roller shafts, symbol 250 indicates second roller devices which receive the extruded formed bodies 100 and place the received extruded formed bodies 100 on a receiving member 260 described later, symbol 252 indicates rollers, symbol 254 indicates roller shafts, symbol 260 indicates a receiving member, and symbol 262 indicates an inclined portion.

In the extruding step S4, as shown in FIG. 2, an extruded formed body 100 extruded from the forming nozzle 210 is cut into extruded members 100 of a fixed size using "the take-out/cutting device" 220 which is operated in synchronism with an extruding speed of the extruded formed body 100, and the extruded members 100 are sequentially placed on the receiving member 260. To be more specific, at a point of time that a compound is extruded from the extruding device by a predetermined length, the cutting device 230 is moved upwardly or downwardly thus preparing an extruded formed body 100 of a predetermined length. The prepared extruded formed body 100 is fed along the downward direction in the paper that the drawing is on by the first roller devices 240 and the second roller devices 250. The rollers 242 of the first roller devices 240 and the rollers 252 of the second roller devices 250 are rotated in synchronism with an extruding speed of the extruded formed body 100. Thereafter, a distance between the rollers 252 of the second roller device 250 is increased, and the extruded formed body 100 is placed on the receiving member 260. Here, the inclined portion 262 is formed on the receiving member 260, and the extruded formed body 100 rolls on to a predetermined position in the leftward direction in the paper that the drawing is on.

3. Drying Step S6

Figure 3:
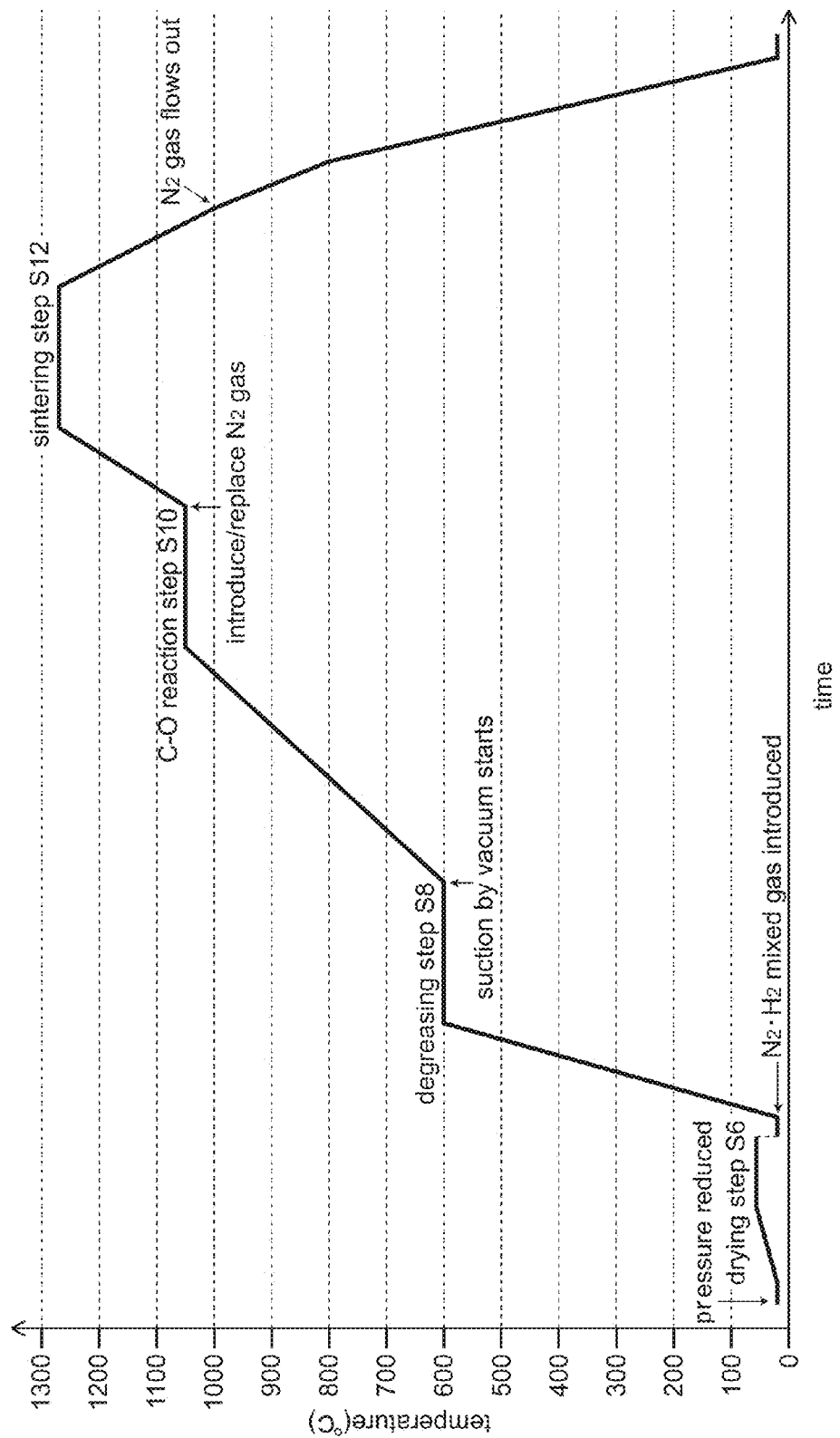
[FIG. 3]
A graph for explaining steps of heat treatment from "drying step" to "sintering step" out of respective steps of the method for manufacturing a welding material according to the example.

FIG. 3 is a graph for explaining steps of heat treatment from "drying step" to "sintering step" out of respective steps of the method for manufacturing a welding material according to the example.

The extruded formed body prepared in the extruding step S4 is conveyed to a reduced-pressure dryer after naturally drying the extruded formed body for 2 days and, in accordance with steps of heat treatment shown in FIG. 3, a temperature of the extruded formed body is elevated from 20° C. (first temperature) to 60° C. (second temperature) under a reduced pressure atmosphere (500 Pa) spending 3 hours and, thereafter, the extruded formed body is held at a temperature of 60° C. for 4 hours thus drying the extruded formed body. By carrying out this drying step S6, moisture is removed from the extruded formed body.

4. Degreasing Step S8

Next, the extruded formed body dried in the drying step S6 is conveyed to a vacuum degreasing and sintering device (obtained by partially remodeled VHSgr (product number) made by SHIMADZU MECTEM, INC.). In accordance with steps of heat treatment shown in FIG. 3, a temperature of the extruded formed body is elevated from 20° C. to 600° C. spending 2 hours and, thereafter, the extruded formed body is held at a temperature of 600° C. for 3 hours thus carrying out the degreasing step S8. The degreasing step S8 is carried out while introducing a mixed gas made of a nitrogen gas and a hydrogen gas (mixing ratio being 6:4) at a rate of 10 L/min. By carrying out this degreasing step S8, remaining moisture, a binder component and oxygen are removed from the extruded formed body. In this example, the degreasing step S8, and the C—O reaction step S10 and the sintering step S12 described later are continuously carried out using the same vacuum degreasing and sintering device.

5. C—O Reaction Step S10

Next, the extruded formed body from which the binder component is removed in the degreasing step S8 is subjected to the C—O reaction step S10 in accordance with steps of heat treatment shown in FIG. 3. That is, a temperature of the extruded formed body is elevated from 600° C. to 1050° C. spending 5 hours under a vacuum atmosphere and, thereafter, the extruded formed body is held at a temperature of 1050° C. for 3 hours. Here, the degree of vacuum in the vacuum degreasing and sintering device reaches the predetermined degree of vacuum which falls within a range of $1 \times 10^{-4}$ Pa to 20 Pa. By carrying out C—O reaction step S10, oxygen present on a surface of and in the inside of alloy powder and carbon derived from a binder are removed by a C—O reaction.

6. Sintering Step S12

Next, the extruded formed body from which oxygen present on a surface of and in the inside of alloy powder and carbon derived from a binder are removed in the C—O reaction step S10 is subjected to the sintering step S12 in accordance with steps of heat treatment shown in FIG. 3. That is, a temperature of the extruded formed body is elevated from 1050° C. to 1270° C. spending 1 hour and 40 minutes under a nitrogen gas atmosphere and, thereafter, the extruded formed body is held at a temperature of 1270° C. for 3 hours. By carrying out this sintering step S12, a welding material according to the example is prepared. The welding material according to this example has a columnar shape with a diameter of 3.9 mm and a length of 930 mm, and sintering density of the welding material is 8.54 g/cm³ (sintering density ratio: 97%).

Test Example

Hereinafter, advantageous effects of the present invention are explained in conjunction with test examples.

Test examples prove that the method for manufacturing a welding material according to the present invention can overcome all of the above-mentioned six drawbacks (a) to (f).

1. Preparation of Specimens

An extruded formed body prepared in the same manner as the above-mentioned example is employed as an example 1. A welding material which is prepared in the same manner as the above-mentioned example except for that the sintering step is carried out under conditions where a sintering atmosphere is an argon atmosphere and a maximum sintering temperature is set to 1290° C. is employed as an example 2. Further, a welding material prepared by the method for manufacturing a welding material described in patent literature 1 is employed as a comparison example 1. Still further, a welding material prepared by the method for manufacturing a welding material described in patent literature 2 is employed as a comparison example 2. In all specimens, alloy powder whose carbon content is 1.26 weight % is used. Still further, in all specimens, alloy powder whose chromium content is 30.84 weight % is used. Still further, in all specimens, alloy powder whose oxygen content is 0.10 weight % (oxygen content in first alloy powder: 0.012 weight %, content of oxygen in second alloy powder: 0.4 weight %) is used. Further, in both specimens of the example 1 and the example 2, alloy powder whose nitrogen content is 0.070 weight % is used.

2-1. Evaluation Method 1

The evaluation based on the evaluation method 1 is performed as follows for each of the example 1, the example 2, the comparison example 1 and the comparison example 2. Extruded formed bodies are conveyed to a vacuum degreasing and sintering device in a state where 6 extruded formed bodies are placed on a ceramic-made setter, and steps ranging from a degreasing step to a sintering step are carried out sequentially so as to manufacture welding materials. Then, it is determined with the naked eye whether or not cracks occur in the welding material or the extruded formed body is broken into fragments (see FIG. 5 and FIG. 6 described later). As criteria for evaluation, for each specimen, the score "bad" is given when cracks occur in any one of 6 welding materials or any one of the welding materials is broken into fragments, and the score "good" is given when cracks occur in none of 6 welding materials or none of the welding materials is broken into fragments. These scores are directly filled out in Table shown in FIG. 4 described later.

2-2. Evaluation Method 2

The evaluation based on the evaluation method 2 is performed as follows for each of the example 1, the example 2, the comparison example 1 and the comparison example 2. Extruded formed bodies are conveyed to a vacuum degreasing and sintering device in a state where 6 extruded formed bodies are placed on a ceramic-made setter, and steps ranging from a degreasing step to a sintering step are carried out sequentially so as to manufacture welding materials. Then, it is determined with naked eyes whether or not the straightness or the circularity of a welding material is deteriorated. The circularity of the welding material is evaluated in such a manner that a larger diameter "a" and a smaller diameter "b" of a welding material are measured at arbitrarily chosen 10 points using a micrometer, a ratio "b/a" at each point is calculated, and an arithmetic average value is obtained. As criteria for evaluation of the circularity, with respect to the respective specimens, the score "bad" is given when the circularity of any one of 6 welding materials is deteriorated, and the score "good" is given when the circularity of none of 6 welding materials is deteriorated. The scores with respect to the circularity which are obtained as described above and values "b/a" which are calculated as described above are directly filled out in Table shown in FIG. 4 described later.

2-3. Evaluation Method 3

The evaluation based on the evaluation method 3 is performed by measuring sintering density of a melting material for each of the example 1, the example 2, the comparison example 1 and the comparison example 2. A sintering density ratio which is obtained by dividing measured sintering density by true density is directly filled out in Table shown in FIG. 4 described later.

2-4. Evaluation Method 4

The evaluation based on the evaluation method 4 is performed as follows for each of the example 1, the example 2, the comparison example 1 and the comparison example 2. TIG welding (welding speed: 30mm/min) is performed using a welding material and, thereafter, a welded surface is cut, and a microstructure observation of a cross section of a welded part is performed using a metal microscope (see FIG. 7 and FIG. 8 described later). As criteria for evaluation, for each specimen, the score "bad" is given when 5 or more pinholes having a diameter of 10 μm or more are confirmed in an image (area) obtained by enlarging with magnification of 100 times, the score "good" is given when 1 to 4 pin holes having a diameter of 10 μm or more are confirmed in the image, and the score "very good" is given when even 1 piece of pin hole having a diameter of 10 μm or more is not confirmed in the image. The scores are directly filled out in Table shown in FIG. 4 described later.

2-5. Evaluation Method 5

The evaluation based on the evaluation method 5 is performed by measuring a content of carbon in a melting material by a carbon analyzer (made by LECO Japan Corporation, product number: C600) for each of the example 1, the example 2, the comparison example 1 and the comparison example 2. A measured carbon content is directly filled out in Table shown in FIG. 4 described later.

2-6. Evaluation Method 6

The evaluation based on the evaluation method 6 is performed by measuring a content of chromium in a melting material using anatomic absorption spectrophotometer (made by Shimadzu Corporation, product number: AA-6200) for each of the example 1, the example 2, the comparison example 1 and the comparison example 2. A measured content of chromium is directly filled out in Table shown in FIG. 4 described later.

2-7. Evaluation Method 7

The evaluation based on the evaluation method 7 is performed by measuring a content of oxygen in a melting material using an oxygen/nitrogen simultaneous analyzer (made by LECO Japan Corporation, product number: TC400) for each of the example 1, the example 2, the comparison example 1 and the comparison example 2. A measured content of oxygen is directly filled out in Table shown in FIG. 4 described later.

2-8. Evaluation Method 8

The evaluation based on the evaluation method 8 is performed by measuring a content of nitrogen in a melting material using an oxygen/nitrogen simultaneous analyzer (made by LECO Japan Corporation, product number: TC400) for each of the example 1 and the example 2. A measured content of nitrogen is directly filled out in Table shown in FIG. 4 described later.

3. Result of Evaluation

FIG. 4 shows results of evaluations with respect to the example 1, the example 2, the comparison example 1 and the comparison example 2.

3-1 Result of Evaluation by Evaluation Method 1

The result of evaluation by the evaluation method 1 is shown in Table in FIG. 4. As can be understood from Table in FIG. 4, it is found that the method for manufacturing a welding material according to the present invention (example 1 and example 2) is a method which can overcome "a drawback (a) that cracks are liable to be generated in the extruded formed body or the extruded formed body is liable to be broken into fragments in the course of carrying out the steps ranging from the degreasing step to the sintering step".

Figure 5A:
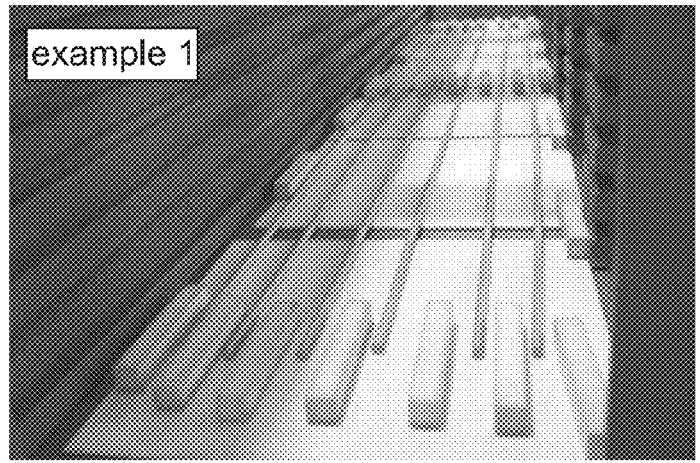
[FIG. 5]
Views showing the external appearances of a welding material after carrying out a sintering step in the example 1 and the example 2.
Figure 5B:
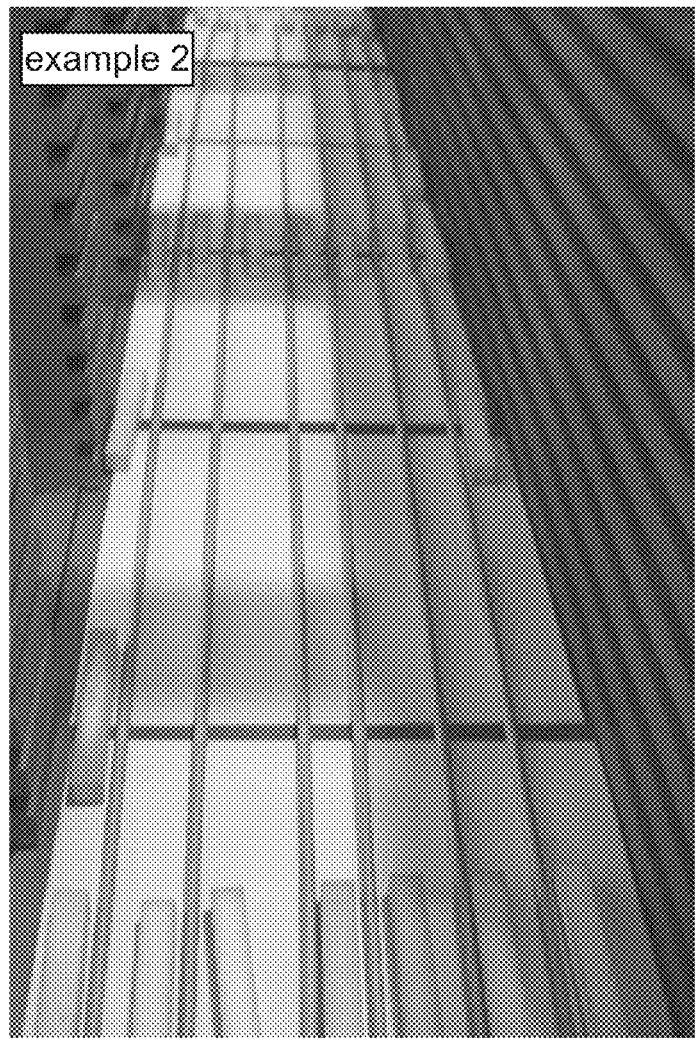
Figure 6:
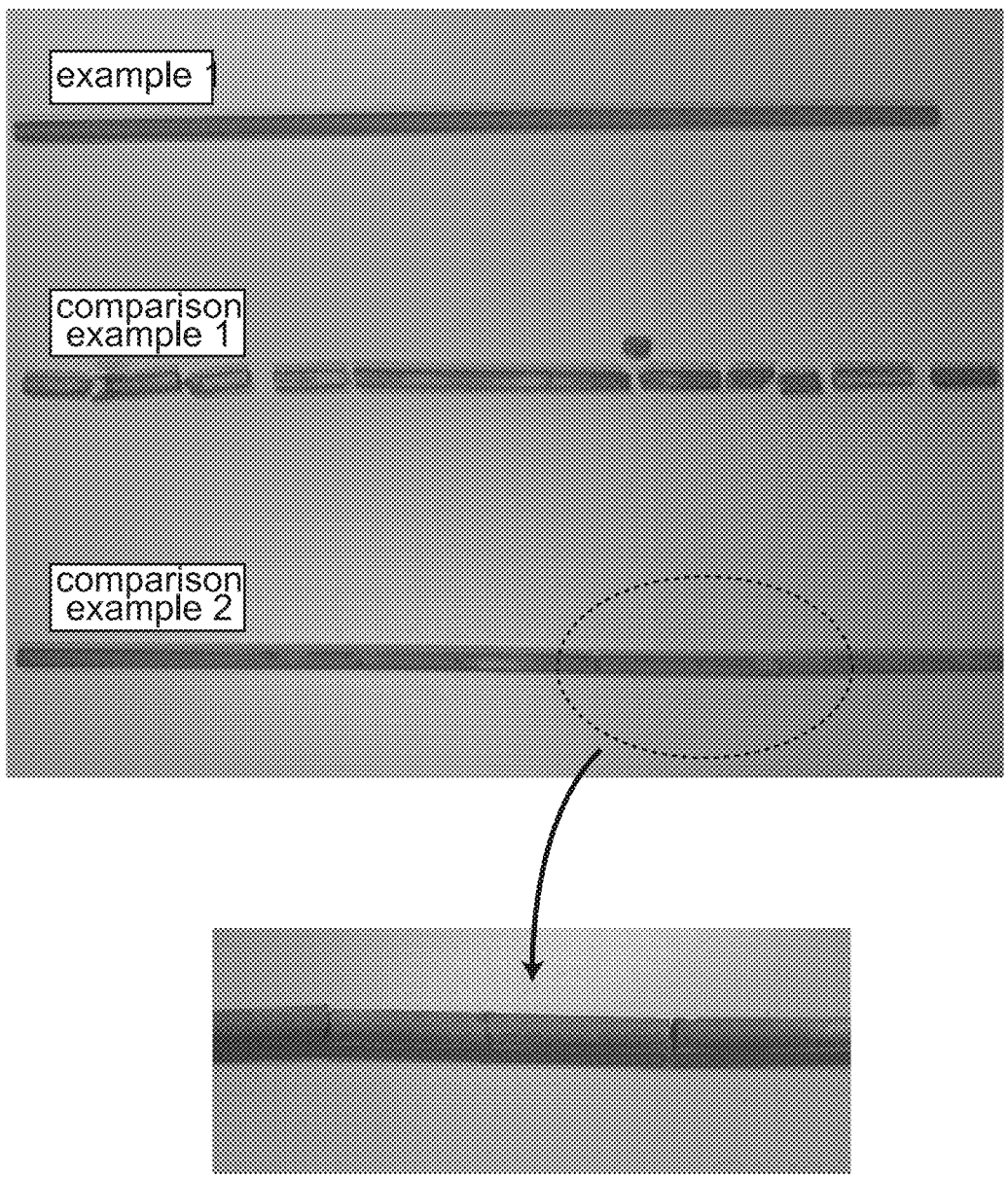
[FIG. 6]
A view showing the external appearances of welding materials after carrying out the sintering step in the example 1, the comparison example 1, and the comparison example 2.

FIG. 5(a) and FIG. 5(b) are views showing the external appearances of a welding material after a sintering step is carried out with respect to the example 1 and the example 2, wherein FIG. 5(a) is the view showing the external appearance after the sintering step is carried out with respect to the example 1, and FIG. 5(b) is the view showing the external appearance after the sintering step is carried out with respect to the example 2. FIG. 6 is a view showing the external appearances of welding materials after the sintering step is carried out with respect to the example 1, the comparison example 1 and the comparison example 2.

It is apparent from FIG. 5 and FIG. 6 that the method for manufacturing a welding material according to the present invention (example 1 and example 2) is a method which can overcome "a drawback (a) that cracks are liable to be generated in the extruded formed body or the extruded formed body is liable to be broken into fragments in the course of carrying out the steps ranging from the degreasing step to the sintering step".

3-2 Result of Evaluation by Evaluation Method 2

The result of evaluation by the evaluation method 2 is shown in Table in FIG. 4. As can be understood from Table in FIG. 4, it is found that the method for manufacturing a welding material according to the present invention (example 1 and example 2) is a method which can overcome "a drawback (b) that straightness or circularity is liable to be deteriorated in the course of carrying out the steps ranging from the degreasing step to the sintering step".

3-3 Result of Evaluation by Evaluation Method 3

The result of evaluation by the evaluation method 3 is shown in Table in FIG. 4. As can be understood from Table in FIG. 4, in the case of the method for manufacturing a welding material according to the present invention (example 1 and example 2), a welding material can acquire high sintering density ratio. From this result, it is found that the method for manufacturing a welding material according to the present invention (example 1 and example 2) is a method which can sufficiently sinter alloy powder and thereby the method can overcome "a drawback (c) that it is difficult to accurately control sintering density of a welding material".

3-4 Result of Evaluation by Evaluation Method 4

The result of evaluation by the evaluation method 4 is shown in Table in FIG. 4. As can be understood from Table in FIG. 4, it is found that the method for manufacturing a welding material according to the present invention (example 1 and example 2) is a method which can overcome "a drawback (d) that pin holes are liable to be generated in the inside of bead when a welding material is used in a welding operation".

Figure 7A:
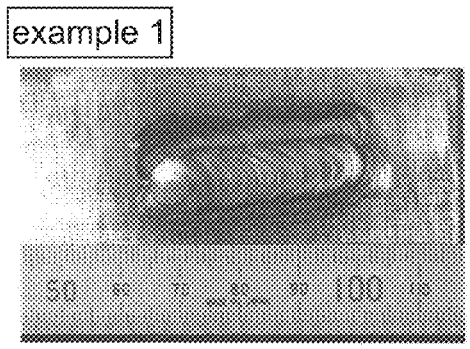
[FIG. 7]
Views showing a cross section of a welded part of a welding material in the example 1 obtained by a metal microscope.
Figure 7B:
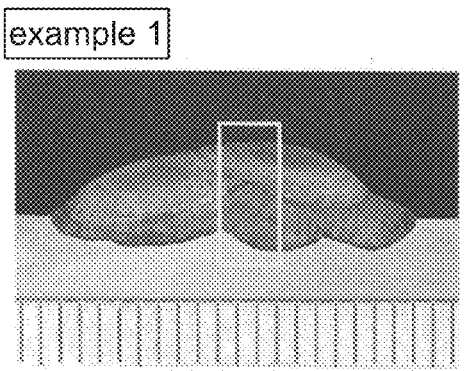
Figure 7C:
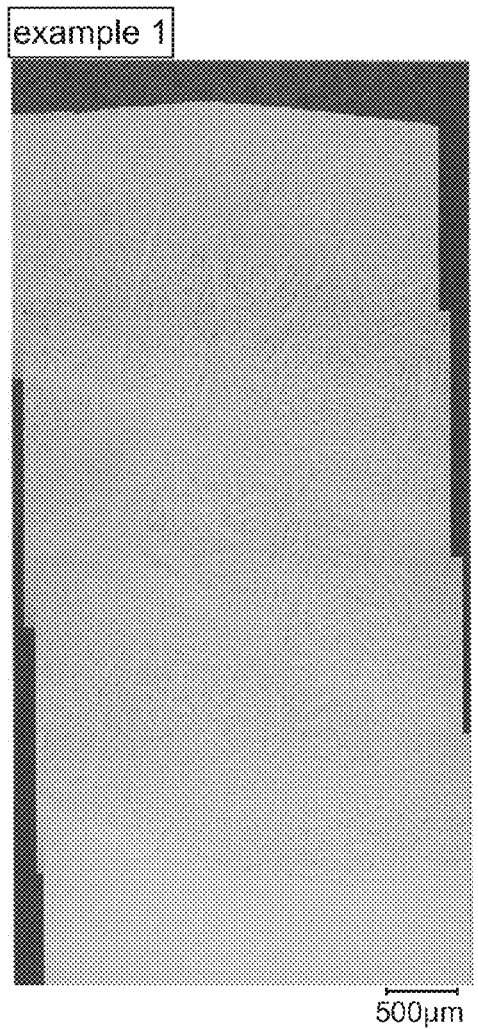
Figure 8A:
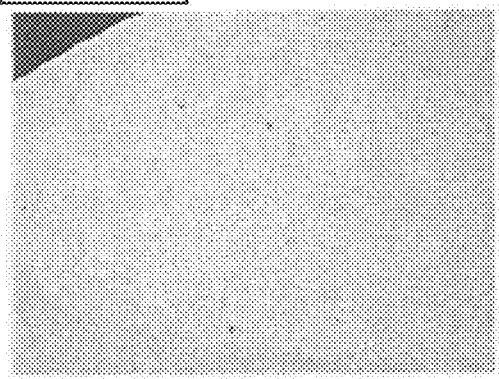
[FIG. 8]
Views showing a cross section of a welded part in the example 2, the comparison example 1 and the comparison example 2.
Figure 8B:
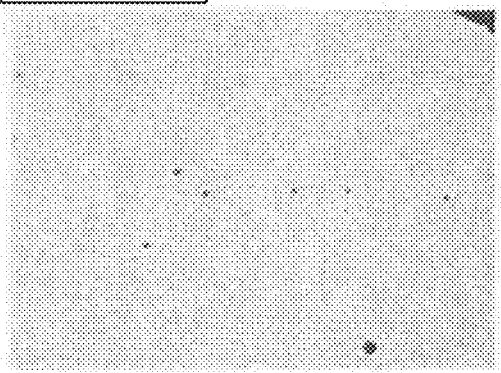
Figure 8C:
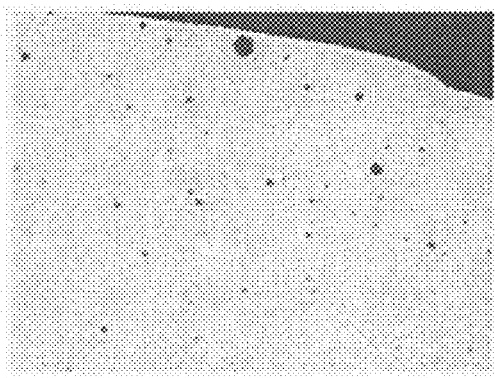

FIG. 7(a) to FIG. 7(c) are views showing a cross section of a welded part in the example 1 obtained by a metal microscope, wherein FIG. 7(a) is a plan view of a buildup portion, FIG. 7(b) is a side view of the buildup portion, and FIG. 7(c) is a view showing a cross section of a welded part in a portion indicated by a square in FIG. 7(b). FIG. 8(a) to FIG. 8(c) are views showing a cross section of a welded part in an example 2, a comparison example 1 and a comparison example 2, wherein FIG. 8(a) is a view showing a cross section of a welded part in the example 2, FIG. 8(b) is a view showing a cross section of a welded part in the comparison example 1, and FIG. 8(c) is a view showing a cross section of a welded part in the comparison example 2. A pattern such as wrinkles appearing on a surface of a photograph in FIG. 7(c) is a crystal pattern of metal. The crystal pattern is unavoidably formed in steps of polishing and chemically etching a cross section of a bead. Here, chemical etching is performed after polishing so as to remove a buildup of metal which may be embedded into pin holes during polishing.

It is apparent from FIG. 7 and FIG. 8 that the method for manufacturing a welding material according to the present invention (example 1 and example 2) is a method which can overcome "a drawback (d) that pin holes are liable to be generated in the inside of bead when a welding material is used in a welding operation".

3-5 Result of Evaluation by Evaluation Method 5

The result of evaluation by the evaluation method 5 is shown in Table in FIG. 4. As can be understood from Table in FIG. 4, in the case of the method for manufacturing a welding material according to the present invention (example 1 and example 2), a content of carbon in the welding material is 1.25 weight % which is substantially equal to 1.26 weight % being a content of carbon in alloy powder constituting a raw material. Accordingly, it is found that the method for manufacturing a welding material according to the present invention (example 1 and example 2) is a method which can overcome "a drawback (e) that it is difficult to accurately control a content of carbon in a welding material".

3-6 Result of Evaluation by Evaluation Method 6

The result of evaluation by the evaluation method 6 is shown in Table in FIG. 4. As can be understood from Table in FIG. 4, in the case of the method for manufacturing a welding material according to the present invention (example 1 and example 2), a content of chromium in the welding material is 30.84 weight % which is equal to 30.84 weight % being a content of chromium in alloy powder constituting a raw material or 30.83 weight % which is substantially equal to 30.84 weight % being the content of chromium in alloy powder. Accordingly, it is found that the method for manufacturing a welding material according to the present invention (example 1 and example 2) is a method which can overcome "a drawback (f) that it is difficult to accurately control a content of Cr in a welding material".

3-7 Result of Evaluation by Evaluation Method 7

The result of evaluation by the evaluation method 7 is shown in Table in FIG. 4. As can be understood from Table in FIG. 4, in the case of the method for manufacturing a welding material according to the present invention (example 1 and example 2), a content of oxygen in the welding material is 0.011 weight % or 0.012 weight % which is considerably lower than 0.1 weight % being a content of oxygen in alloy powder constituting a raw material. Accordingly, it is found that the method for manufacturing a welding material according to the present invention (example 1 and example 2) is a method which can manufacture a welding material which has a content of oxygen lower than a content of oxygen in alloy powder.

3-8 Result of Evaluation by Evaluation Method 8

The result of evaluation by the evaluation method 8 is shown in Table in FIG. 4. As can be understood from Table in FIG. 4, in the case of the method for manufacturing a welding material according to the present invention (example 1 and example 2), a content of nitrogen in the welding material is 0.220 weight % or 0.030 weight %. Accordingly, it is found that the method for manufacturing a welding material according to the present invention (example 1 and example 2) is a method which can manufacture a welding material which has a relatively low content of nitrogen. Accordingly, it is found that, also from this viewpoint, the welding material manufactured by the method for manufacturing a welding material according to the present invention is a welding material by which pin holes are hardly generated at the time of welding and a welded product having high bead toughness and improved welding quality can be manufactured.

Although the method for manufacturing a welding material according to the present invention has been explained in conjunction with the above-mentioned embodiment, the present invention is not limited to the above-mentioned embodiment or examples, and the present invention can be carried out in various modes without departing from the gist of the present invention. For example, the following modifications are conceivable.

(1) Although a material equivalent to Stellite No. 6 (registered trademark of Deloro Stellite Group) is used as alloy powder made of a hard-to-work material in the above-mentioned example, the present invention is not limited to such alloy powder. For example, alloy powder made of Co-based alloy other than a Stellite No. 6 counterpart (for example, a Stellite No. 12 counterpart, a Stellite No. 21 counterpart, a Stellite No. 1 counterpart or the like), alloy powder made of Ni-based alloy (for example, a colmonoy counterpart) or alloy powder made of Fe-based alloy (stainless steel such as JIS D410) may be used.

(2) Although alloy powder having an average particle size of 45 µm is used as first alloy powder, and alloy powder having an average particle size of 10 µm is used as second alloy powder in the above-mentioned example, the present invention is not limited to such alloy powder. For example, alloy powder having an average particle size of 20 µm to 100 µm may be used as first alloy powder, and alloy powder having an average particle size of 1 to 20 µm may be used as second alloy powder.

(3) In the above-mentioned example, as the compound, a compound which satisfies a relationship of "A/(A+B)=90%" assuming a mixing quantity of the first alloy powder in the compound as A and a mixing quantity of the second alloy powder in the compound as B is used. However, the present invention is not limited to such a compound. For example, a compound which satisfies a relationship of "60%≤A/(A+B)≤95%" may be used.

(4) Although a methylcellulose-based binder is used as a water soluble binder in the above-mentioned example, the present invention is not limited to such a binder. For example, a binder other than the methylcellulose-based binder may be used.

(5) In the above-mentioned example, as the compound, a compound which contains a binder within a range of 2.63 parts by weight (2.5 weight %) for 100 parts by weight (95 weight %) of alloy powder is used. However, the present invention is not limited to such a compound. For example, a compound which contains a binder within a range of 1.5 parts by weight to 5.5 parts by weight for 100 parts by weight of alloy powder may be used.

(6) Although the natural drying step is carried out between the extruding step and the drying step in the above-mentioned example, the present invention is not limited to such sequence of steps . For example, the natural drying step may not be carried out between the extruding step and the drying step.

(7) Although the drying step is carried out between the extruding step and the degreasing step in the above-mentioned example, the present invention is not limited to such sequence of steps. The drying step may not be carried out between the extruding step and the degreasing step.

(8) Although the degreasing step is carried out under an atmosphere into which "a mixed gas made of a nitrogen gas and a hydrogen gas" is introduced in the above-mentioned example, the present invention is not limited to such an atmosphere. For example, the degreasing step may be carried out under a reducing atmosphere (for example, a pure hydrogen gas atmosphere, an ammonia-cracked gas atmosphere) instead of "a mixed gas made of a nitrogen gas and a hydrogen gas" or under an inert gas atmosphere (for example, a pure nitrogen gas atmosphere) or under a reduced pressure atmosphere which is obtained by reducing a pressure in these atmospheres.

(9) Although the sintering step is carried out under a nitrogen gas atmosphere in the above-mentioned example, the present invention is not limited to such an atmosphere. For example, the sintering step may be carried out under an inert gas atmosphere (for example, an Ar gas atmosphere) other than a nitrogen gas atmosphere or under a reducing atmosphere (for example, an ammonia-cracked gas atmosphere, a mixed gas atmosphere made of a nitrogen gas and a hydrogen gas).

(10) Although the degreasing step, the C—O reaction step and the sintering step are sequentially carried out in one vacuum degreasing and sintering device in the above-mentioned example, the present invention is not limited to such a process. For example, the degreasing step, the C—O reaction step and the sintering step may be carried out using different sintering devices respectively. The degreasing step and the C—O reaction step may be carried out using one sintering device and the sintering step may be carried out using another sintering device. The degreasing step may be carried out using one sintering device and the C—O reaction step and the sintering step may be carried out using another sintering device.

(11) Although a welding rod is manufactured using the method for manufacturing a welding material according to the present invention in the above-mentioned example, the present invention is not limited to such a welding rod. Other welding materials including a tubular welding material may be manufactured using the method for manufacturing a welding material according to the present invention. In this case, a forming nozzle 210*a* shown in a frame A1' in FIG. 2 may be used in place of the forming nozzle 210 shown in a frame A1 in FIG. 2.

The invention claimed is:

1. A method for manufacturing a welding material comprising in the order below: a compound preparing step in which a compound is prepared by mixing alloy powder containing a first alloy powder having a first average particle size and a second alloy powder having a second average particle size smaller than the first average particle size, a water soluble binder and water; an extruding step in which an extruded formed body is prepared by extruding the compound prepared in the compound preparing step from a forming nozzle using an extrusion machine; a degreasing step in which the binder is removed from the extruded formed body prepared in the extruding step by heating the extruded formed body to a predetermined temperature of 400° C. or above under an inert gas atmosphere, a reducing gas atmosphere or a reduced pressure atmosphere; a C—O reaction step in which oxygen present on a surface of and in the inside of the alloy powder and carbon derived from the binder are removed by causing a reaction between oxygen and carbon by heating the extruded formed body from which the binder is removed in the degreasing step to a predetermined temperature which falls within a range of 950° C. to 1150° C. under a vacuum atmosphere; a sintering step in which the welding material is formed from the extruded formed body, the extruded formed body from which oxygen present on the surface of and in the inside of the alloy powder and carbon derived from the binder are removed in the C—O reaction step is heated to a predetermined temperature which falls within a range of 1200° C. to 1350° C. under an inert gas atmosphere, a reducing gas atmosphere or a mixed gas atmosphere made of an inert pas and a reducing gas thus forming the welding material; and a drying step carried out after the extruding step and before the degreasing step in which moisture is removed from the extruded formed body, wherein: in the compound preparing step, a ratio of water to the alloy powder falls within a range of 1.0 weight % to 2.1 weight %, and the extruding step is carried out using a compound with a viscosity in a range of 1.8 P (poise) to 2.5 P (poise), as measured by a flow characteristic tester and the first alloy powder is a Co-based powder.

2. The method for manufacturing a welding material according to claim 1, wherein in the C—0 reaction step, the predetermined temperature falls within a range of 1000° C. to 1100° C.

3. The method for manufacturing a welding material according to claim 1, wherein in the C—O reaction step, the extruded formed body is heated to the predetermined temperature and, thereafter, is kept at the predetermined temperature until a degree of vacuum reaches a predetermined degree of vacuum which falls within a range of $1 \times 10^{-4}$ Pa to 20 Pa.

4. The method for manufacturing a welding material according to claim 1, wherein the sintering step is carried out under a nitrogen gas atmosphere, an ammonia-cracked gas atmosphere or "a mixed gas atmosphere made of a nitrogen gas and a hydrogen gas".

5. The method for manufacturing a welding material according to claim 1, wherein the first average particle size falls within a range of 20 μm to 100 μm, and the second average particle size falls within a range of 1 μm to 20 μm.

6. The method for manufacturing a welding material according to claim 5, wherein assuming a mixing quantity of the first alloy powder in the compound as A and a mixing quantity of the second alloy powder in the compound as B, a relationship of 60 wt % ≤A/(A+B)≤95 wt % is satisfied.

7. The method for manufacturing a welding material according to claim 5, wherein the first alloy powder is alloy powder manufactured by a gas atomizing method, and the second alloy powder is alloy powder manufactured by a water atomizing method.

8. The method for manufacturing a welding material according to claim 1, wherein a rate of the binder contained in the compound falls within a range of 1.5 parts by weight to 5.5 parts by weight with respect to 100 parts by weight of the alloy powder.

9. The method for manufacturing a welding material according to claim 1, wherein in the extruding step, the extruded formed body extruded from the forming nozzle is cut into extruded members of a fixed size using "a take-out/cutting device" which is operated in synchronism with an extruding speed of the extruded formed body, and the extruded members are sequentially placed on a receiving member.

10. The method for manufacturing a welding material according to claim 1, wherein the degreasing step is carried out under a reduced pressure atmosphere which is formed by reducing pressure in the atmosphere while introducing an inert gas or a reducing gas into the atmosphere.

11. The method for manufacturing a welding material according to claim 1, wherein the method for manufacturing a welding material further includes, between the extruding step and the degreasing step, a drying step in which the extruded formed body prepared in the extruding step is dried by gradually elevating a temperature of the extruded formed body from a first temperature which falls within a range of 5° C. to 40° C. to a second temperature which falls within a range of 60° C. to 100° C. under an inert gas atmosphere, a reducing gas atmosphere or a reduced pressure atmosphere.

12. A method for manufacturing a welding material comprising in the order below:
- a compound preparing step in which a compound is prepared by mixing alloy powder containing a first alloy powder having a first average particle size and a second alloy powder having a second average particle size smaller than the first average particle size, a water soluble binder and water;
- an extruding step in which an extruded formed body is prepared by extruding the compound prepared in the compound preparing step from a forming nozzle;
- a degreasing step in which the binder is removed from the extruded formed body prepared in the extruding step by heating the extruded formed body to a predetermined temperature of 400° C. or above under an inert gas atmosphere, a reducing gas atmosphere or a reduced pressure atmosphere;
- a C—O reaction step in which oxygen present on a surface of and in the inside of the alloy powder and carbon derived from the binder are removed by causing a reaction between oxygen and carbon by heating the extruded formed body from which the binder is removed in the degreasing step to a predetermined temperature which falls within a range of 950° C. to 1150° C. under a vacuum atmosphere; and
- a sintering step in which the welded material is formed from the extruded formed body, extruded formed body from which oxygen present on the surface of and in the inside of the alloy powder and carbon derived from the binder are removed in the C—O reaction step is heated to a predetermined temperature which falls within a range of 1200° C. to 1350° C. under an inert gas atmosphere, a reducing gas atmosphere or a mixed gas atmosphere made of an inert gas and a reducing gas thus forming the welding material;
- and a drying step carried out after the extruding step and before the degreasing step in which moisture is removed from the extruded formed body, wherein: at least one of the first alloy powder power and the second alloy powder is a Co-based alloy powder, in the compound preparing step, a ratio of water to the alloy powder falls within a range of 1.0 weight % to 2.1 weight %, and the extruding step is carried out using a compound with a viscosity in a range of 1.8 P (poise) to 2.5 P (poise), as measured by a flow characteristic tester.

13. The method for manufacturing a welding material according to claim 1, wherein the second alloy powder is a Co-based alloy powder.

* * * * *